US010920921B2

(12) United States Patent
Cools

(10) Patent No.: US 10,920,921 B2
(45) Date of Patent: Feb. 16, 2021

(54) HOUSING FOR A COMPRESSOR OR EXPANDER INSTALLATION, VACUUM PUMP, GENERATOR OR THE LIKE

(71) Applicant: ATLAS COPCO AIRPOWER, NAAMLOZE VENNOOTSCHAP, Wilrijk (BE)

(72) Inventor: Ronny Antoine J. Cools, Wilrijk (BE)

(73) Assignee: ATLAS COPCO AIRPOWER, NAAMLOZE VENNOOTSCHAP, Wilrijk (BE)

(*) Notice: Subject to any disclaimer, the term of this patent is extended or adjusted under 35 U.S.C. 154(b) by 226 days.

(21) Appl. No.: 15/542,318

(22) PCT Filed: Jan. 5, 2016

(86) PCT No.: PCT/BE2016/000001
§ 371 (c)(1),
(2) Date: Jul. 7, 2017

(87) PCT Pub. No.: WO2016/112438
PCT Pub. Date: Jul. 21, 2016

(65) Prior Publication Data
US 2018/0274713 A1   Sep. 27, 2018

(30) Foreign Application Priority Data
Jan. 14, 2015 (BE) .................................. 2015/5023

(51) Int. Cl.
*F16M 1/08* (2006.01)
*F16M 1/02* (2006.01)
(Continued)

(52) U.S. Cl.
CPC ............... *F16M 1/08* (2013.01); *A47B 55/00* (2013.01); *A47B 81/00* (2013.01); *F01C 21/10* (2013.01); *F16M 1/02* (2013.01); *F16M 1/04* (2013.01)

(58) Field of Classification Search
CPC .. F16M 1/08; F16M 1/00; F16M 1/02; F16M 1/04; F16M 7/00; F01C 21/10;
(Continued)

(56) References Cited

U.S. PATENT DOCUMENTS 1,658,456 A * 2/1928 Meyer ..................... B22C 21/06
248/346.01
3,066,898 A * 12/1962 Haynes ..................... F16M 7/00
248/656
(Continued)

FOREIGN PATENT DOCUMENTS

CN      101494965      7/2009
CN      202695586      1/2013
(Continued)

OTHER PUBLICATIONS

English translation for CN202871887 (Year: 2013).*
International Search Report (ISR) dated May 19, 2016, for PCT/BE2016/000001.

*Primary Examiner* — Hiwot E Tefera
(74) *Attorney, Agent, or Firm* — Bacon & Thomas, PLLC

(57) ABSTRACT

A housing for a compressor or expander installation, vacuum pump, generator or similar, whereby this housing is made of metal plates, wherein at least one of the aforementioned metal plates is provided with one or more reinforcing profiles, respectively longitudinal profiles that extend in a certain longitudinal direction and transverse profiles that extend along a transverse direction that forms an angle to the aforementioned longitudinal direction, whereby the various metal plates and longitudinal profiles and/or transverse
(Continued)

profiles are joined together solely by means of mechanical fasteners.

17 Claims, 6 Drawing Sheets

(51) Int. Cl.
   *F16M 1/04* (2006.01)
   *F01C 21/10* (2006.01)
   *A47B 55/00* (2006.01)
   *A47B 81/00* (2006.01)

(58) Field of Classification Search
   CPC .... F04C 2240/30; H01M 2/10; F25D 23/006; A47B 55/00; A47B 81/00; F04B 39/12; H02K 5/26
   USPC ........ 312/265.1–265.4, 100, 257.1; 248/651, 248/657, 656, 678, 672, 637, 346.01
   See application file for complete search history.

(56) References Cited

U.S. PATENT DOCUMENTS

| | | | |
|---|---|---|---|
| 3,205,674 A | 9/1965 | Arnold et al. | |
| 3,461,328 A * | 8/1969 | Drouard | H02K 5/20 310/52 |
| 3,572,869 A * | 3/1971 | Studinski | A47B 13/08 312/194 |
| 3,652,044 A * | 3/1972 | Manross | F16M 7/00 248/657 |
| 3,729,950 A * | 5/1973 | Astrom | F24F 13/20 62/259.1 |
| 3,797,727 A * | 3/1974 | Downing | B65D 19/06 206/600 |
| 5,228,762 A * | 7/1993 | Mascrier | H02B 1/01 312/265.1 |
| 5,372,262 A * | 12/1994 | Benson | A47B 47/02 211/189 |
| 5,383,409 A * | 1/1995 | Hayakawa | B65D 19/0016 108/51.3 |
| 5,676,438 A | 10/1997 | Jeong | |
| 5,816,173 A * | 10/1998 | Warneford | B65D 19/0026 108/56.3 |
| 6,075,207 A * | 6/2000 | Sielaff | H02B 1/28 174/50.5 |
| 6,166,910 A * | 12/2000 | Ronberg | E05B 73/0082 248/551 |
| 6,478,166 B2 * | 11/2002 | Hung | H05K 7/183 211/175 |
| 7,635,256 B2 * | 12/2009 | Then | F04D 29/601 310/58 |
| 8,336,719 B2 * | 12/2012 | Fan | H05K 7/1488 211/13.1 |
| 2005/0104458 A1 | 5/2005 | Then et al. | |
| 2005/0257552 A1 * | 11/2005 | Yun | F25D 23/006 62/295 |
| 2006/0236901 A1 * | 10/2006 | Lin | B65D 19/0026 108/55.3 |
| 2006/0277938 A1 * | 12/2006 | Meyer | F25D 11/003 62/371 |
| 2008/0203867 A1 * | 8/2008 | Delakowitz | H05K 7/186 312/237 |
| 2008/0309209 A1 * | 12/2008 | McFarland | A47F 5/11 312/249.8 |
| 2009/0009041 A1 * | 1/2009 | Zeidler | A63F 13/08 312/263 |
| 2009/0107161 A1 * | 4/2009 | Jang | F24F 1/56 62/259.1 |
| 2009/0108717 A1 * | 4/2009 | Jang | F24F 1/38 312/100 |
| 2009/0261118 A1 * | 10/2009 | Katritzky | B65G 1/08 221/124 |
| 2009/0308289 A1 * | 12/2009 | Ferguson | B65D 19/0016 108/51.3 |
| 2012/0194750 A1 * | 8/2012 | Carr | A47B 81/064 348/841 |
| 2012/0298834 A1 * | 11/2012 | Fang | E02F 9/163 248/672 |
| 2014/0083650 A1 * | 3/2014 | Ahmed | B65D 19/06 165/104.13 |
| 2014/0091692 A1 * | 4/2014 | Miwa | F24F 13/20 312/285 |
| 2015/0027670 A1 * | 1/2015 | Jinnai | F24F 1/38 165/121 |
| 2016/0201973 A1 * | 7/2016 | Lokhande | F25D 23/006 62/296 |
| 2017/0248268 A1 * | 8/2017 | Copanas | F16M 7/00 |

FOREIGN PATENT DOCUMENTS

| | | |
|---|---|---|
| CN | 202871887 | 4/2013 |
| DE | 2736562 A1 | 2/1979 |
| DE | 9402593 U1 | 4/1994 |
| DE | 102008000701 A1 | 9/2009 |
| GB | 1356466 A | 6/1974 |

* cited by examiner

HOUSING FOR A COMPRESSOR OR EXPANDER INSTALLATION, VACUUM PUMP, GENERATOR OR THE LIKE

The present invention relates to a housing for a compressor or expander installation, vacuum pump, generator or similar.

BACKGROUND OF THE INVENTION

Traditionally the housing of such installations or machines is made of metal plates that are welded together to form a sturdy structure in which all components of the machine can be affixed and with which the machine can be lifted and moved.

Additional profiles are welded on the metal plates as a reinforcement.

Welding the metal plates together is a time-consuming, expensive and environmentally unfriendly process.

Moreover, such a traditional housing is susceptible to corrosion.

Indeed, it is impossible to use galvanised metal plates, as when welding galvanised metal plates harmful vapours are released and the welds created are of a poor quality.

The galvanisation of the housing to counteract corrosion would be too expensive and impractical in view of the large dimensions of the finished housing.

Hence it is now chosen to apply an anti-corrosion surface coating, for example a coat of paint.

This extra step is not only time-consuming because it must be done very meticulously, it is also impossible to apply a good surface coating inside the profiles.

Consequently such a surface coating provides insufficient protection against corrosion.

SUMMARY OF THE INVENTION

The purpose of the present invention is to provide a solution to at least one of the aforementioned and other disadvantages.

The subject of the present invention is a housing for a compressor or expander installation, vacuum pump, generator or similar, whereby this housing is made of metal plates, whereby at least one of the aforementioned metal plates is provided with one or more reinforcing profiles, respectively longitudinal profiles that extend in a certain longitudinal direction and transverse profiles that extend along a transverse direction that forms an angle to the aforementioned longitudinal direction, whereby the various metal plates and longitudinal profiles and/or transverse profiles are joined together solely by means of mechanical fasteners.

An advantage is that the production or assembly of such a housing can be done in a simple, fast and cheap way without welding having to be done.

An additional advantage is that by using longitudinal profiles and transverse profiles the housing will be sufficiently sturdy, even without the use of welding to fasten the different component metal plates together.

Moreover, galvanised metal plates, longitudinal profiles and transverse profiles can be used. As a result, after the production or assembly of the housing, no extra treatment against corrosion will be necessary.

In the most preferred embodiment, the metal plates, the longitudinal profiles and the transverse profiles are galvanised beforehand and/or provided with an anti-corrosion surface coating.

For example, the anti-corrosion surface coating can be applied by painting or another coating technique.

Preferably the longitudinal profiles and/or transverse profiles act as a support in order to fasten components of the compressor or expander installation, vacuum pump or generator.

Preferably the longitudinal profiles and/or transverse profiles are used to lift and move the compressor or expander installation, vacuum pump, generator or similar.

The above can be obtained by suitably choosing the design of the longitudinal profiles and/or transverse profiles.

For example, the transverse profiles can have such a shape and are positioned such that they define a form similar to a transport pallet, whereby the transverse profiles define passages. The aforementioned passages can then be used by a forklift truck.

This has the advantage that these longitudinal profiles and/or transverse profiles can perform a threefold function:
  to guarantee the sturdiness of the housing;
  to fasten components of the machine;
  to lift and move the machine.

Although use can be made of longitudinal profiles and/or transverse profiles that are fastened to the metal plate or plates by means of mechanical fasteners, according to a practical embodiment it is also possible that the longitudinal profiles and/or transverse profiles are formed by folding the metal plate concerned.

In this way a type of 'integrated' profiles are created in the metal plate as it were. This has the advantage that no 'separate' profiles have to be fastened to the metal plate so that time and fasteners can be saved.

These longitudinal profiles and/or transverse profiles can be formed by folding the metal plate into a U-shape.

Nevertheless, it is not excluded that other forms are used, such as for example a V-shape or semicircular shape.

Preferably the aforementioned mechanical fasteners comprise one or more or a combination of the following types of fasteners:
  bolt fastener;
  rivets;
  blind rivet nuts.

It is also possible that other similar fasteners are used such as clamps, screws or similar, for example.

BRIEF DESCRIPTION OF THE DRAWINGS

With the intention of better showing the characteristics of the invention, a few preferred embodiments of a housing for a compressor or expander installation, vacuum pump, generator or similar according to the invention are described hereinafter by way of an example, without any limiting nature, with reference to the accompanying drawings, wherein.

DETAILED DESCRIPTION OF THE INVENTION

Figure 1:
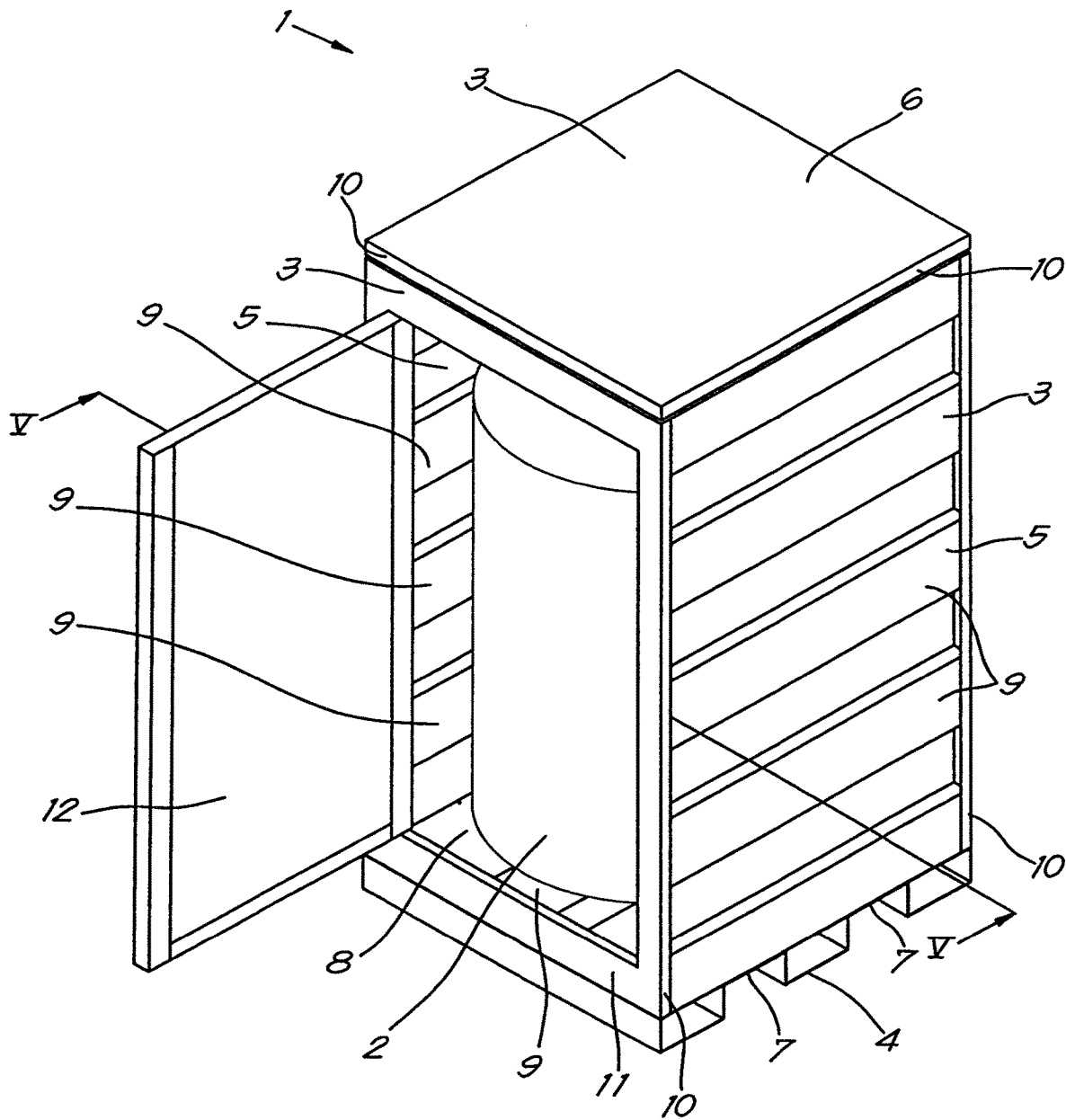
FIG. 1 schematically shows a perspective view of a housing of a compressor installation according to the invention.

The housing 1 shown in FIG. 1 for a compressor installation 2 is made of metal plates 3.

Instead of a compressor installation 2, the machine can also be an expander installation, vacuum pump, generator or similar.

The metal plates 3 are preferably galvanised beforehand, i.e. the metal plates 3 are galvanised before the housing 1 is produced.

The housing 1 comprises a base 4, side walls 5 and a roof 6.

Figure 2:
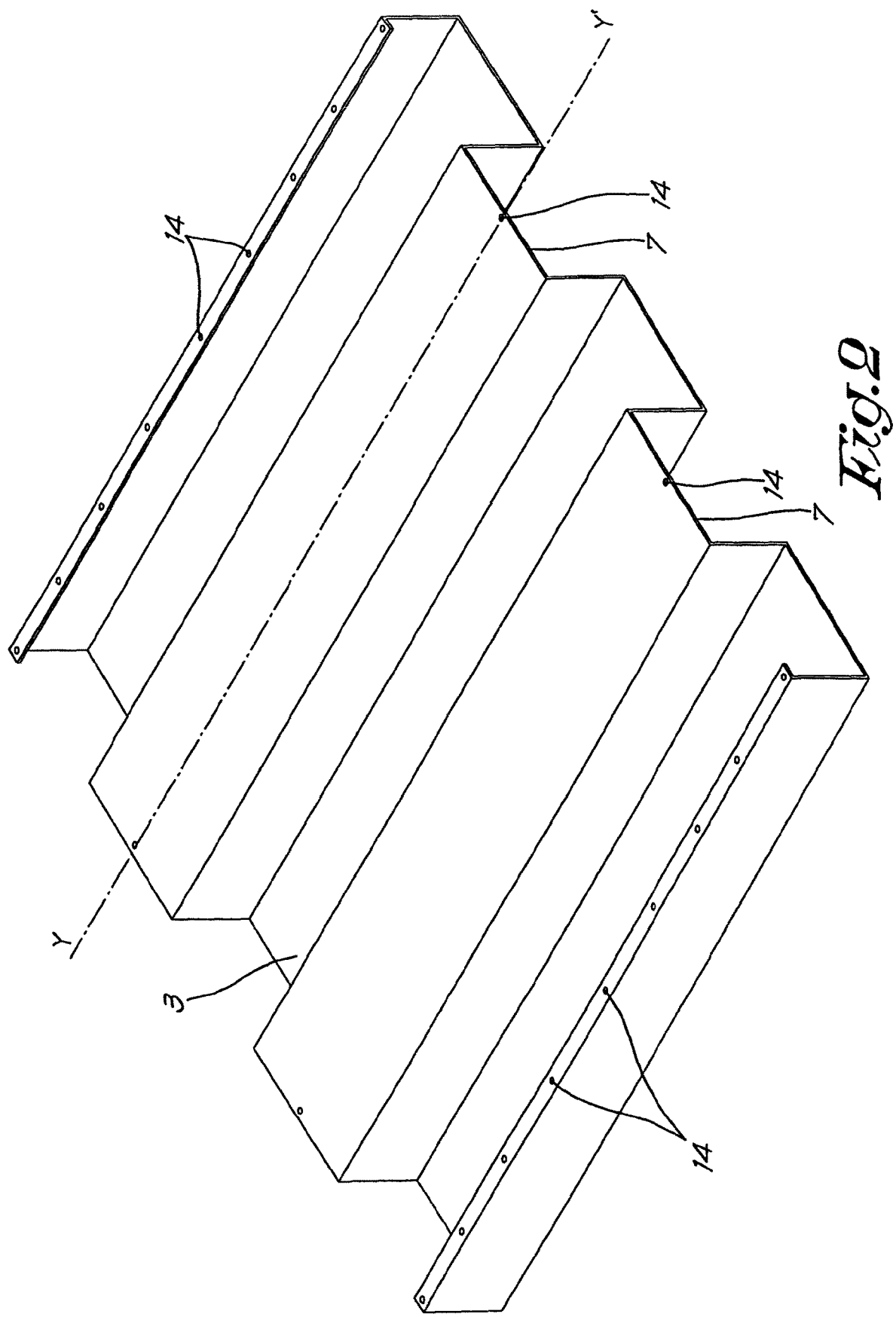
FIGS. 2 and 3 schematically show components of the base of the housing of FIG. 1.
Figure 3:
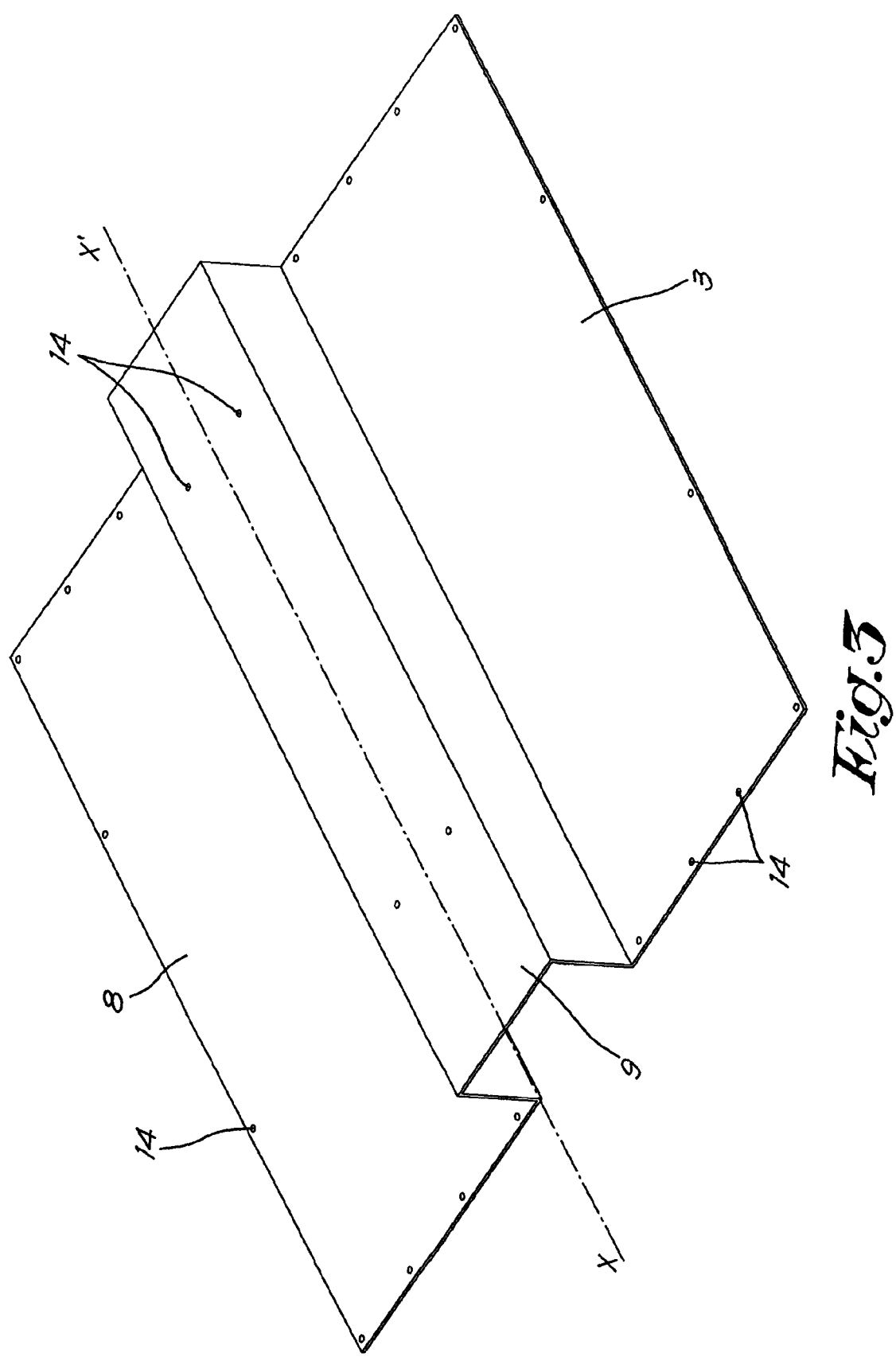

The base 4 is assembled from a number of components, as shown in FIGS. 2 and 3.

The base 4 is constructed from at least two transverse profiles 7, in this case exactly two on which a baseplate 8 is affixed.

As shown in FIG. 2, in this case the two transverse profiles 7 are formed by means of a metal plate 3 that is folded to form the transverse profiles 7, which are located parallel to one another and extend in a transverse direction Y-Y'.

The baseplate 8 is folded to form one longitudinal profile 9 that extends in a longitudinal direction X-X', as shown in FIG. 3.

This longitudinal direction X-X' extends at an angle to the transverse direction Y-Y'. In this case at an angle of 90 degrees.

The longitudinal profile 9 has a U-shaped cross-section, whereby the open side of the U-shape is oriented towards the two transverse profiles 7.

As a result a type of support is created that can be used to mount certain components of the compressor installation 1.

The longitudinal profile 9 and the transverse profiles 7 act as reinforcing profiles to strengthen the baseplate 8.

Furthermore, the housing 1 comprises metal plates 3 that form the side walls 5 and the roof of the housing 1.

Two side walls 5 are made of metal plates 3 that are provided with longitudinal profiles 9 that are formed by folding the metal plate 3 concerned, as shown in FIG. 1.

In this case, but not necessarily, the longitudinal profiles 9 have a U-shape.

The roof 6 and the back wall are made of flat metal plates that are not folded in order to create longitudinal profiles 9 or transverse profiles 7, but which are only folded on one or more edges 10 in order to be able to fasten the metal plates 3 to the side walls 5 and/or the base 4.

The front wall 11 is provided with an access door 12 that provides access to the compressor installation 2 in the housing 1, for inspection, adjustment, maintenance and/or repair of the compressor installation 2.

Instead of providing an access door 12 or access opening, it is also possible that the metal plate 3 of the front wall 11 is detachable, for example because it is fastened by means of a snap fastener.

It is clear that it is not excluded that a number of side walls 5 or the roof 6 are provided with one or more, closable or otherwise, access openings or doors 12.

The various components of the housing 1, i.e. the metal plates 3 of the side walls 5, back wall, front wall 11 and roof 6 and the transverse profiles 7 and the baseplate 8 of the base 4 are fastened together by exclusively using mechanical fasteners 13, without making use of welding.

To this end the various components of the housing 1 are provided with passages 14 at the desired locations.

For example, the metal plates 3 of the side walls 5 can be fastened to the aforementioned baseplate 8 and the transverse profiles 7 of the base by means of the mechanical fasteners 13.

This has the advantage that this can be done much more quickly and more simply than welding.

The mechanical fasteners 13 can be bolt fasteners 15 for example, and blind rivet nuts 16 in places more difficult to reach, for example at the location of longitudinal profiles 9 or transverse profiles 7.

Figure 4:
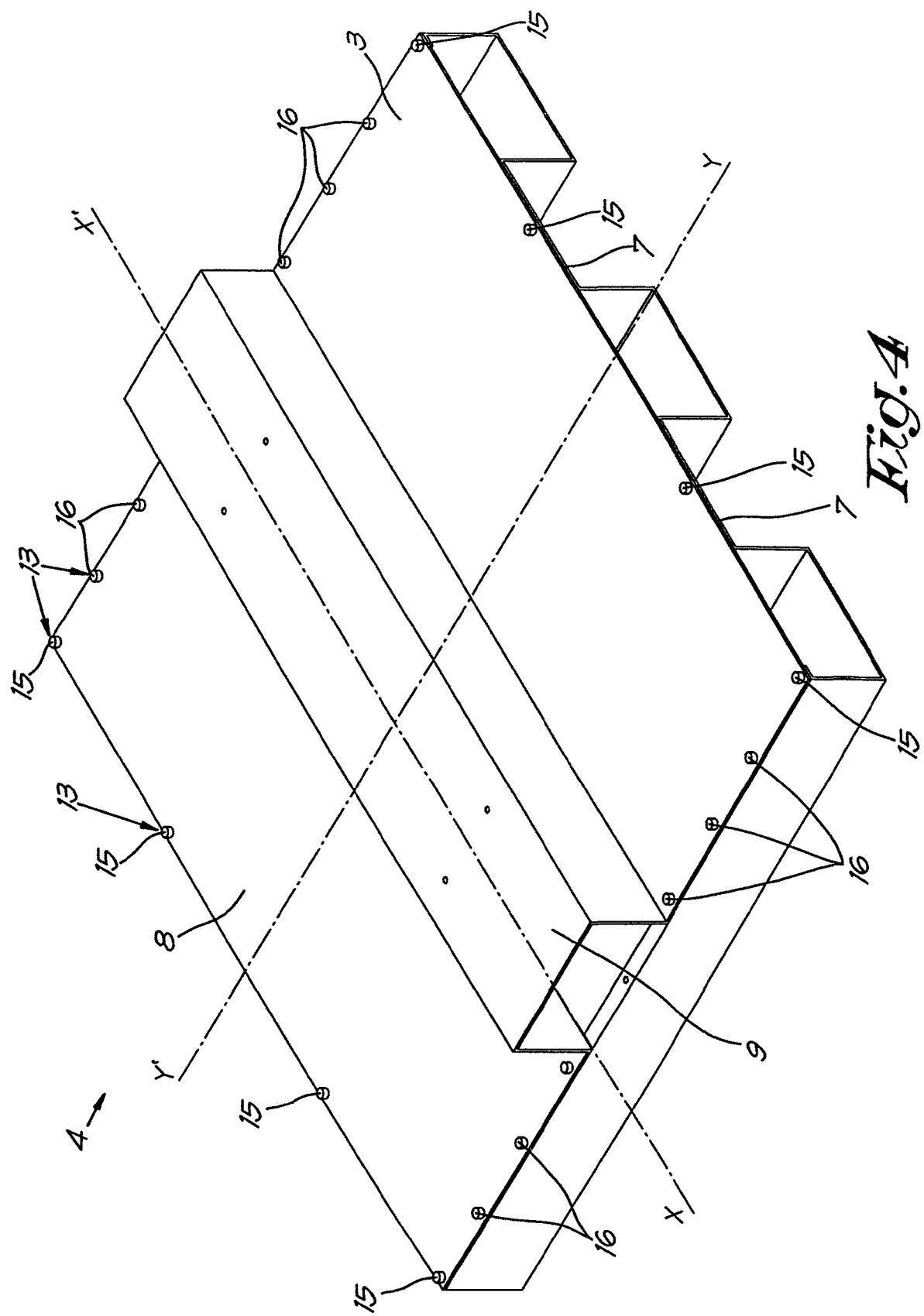
FIG. 4 schematically shows the assembled base of the housing of FIG. 1.

FIG. 4 shows in detail how the baseplate 8 is fastened to the transverse profiles 7, whereby the bolt fasteners 15 and the blind rivet nuts 16 are indicated.

It must be noted here that the longitudinal profiles 9 and the transverse profiles 7 are placed together at an angle of 90 degrees, which gives the base 4 extra sturdiness.

Figure 5:
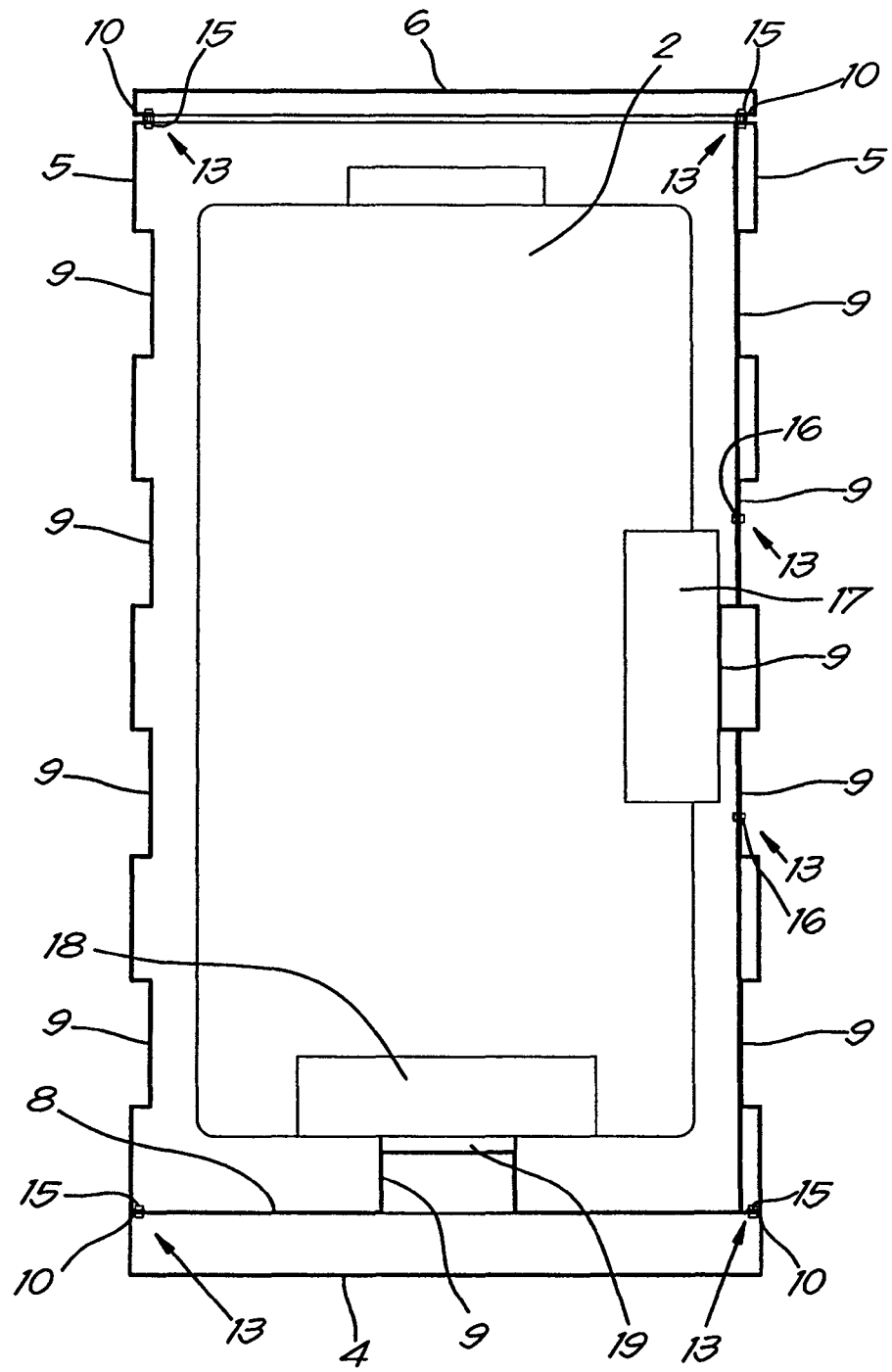
FIG. 5 schematically shows a cross-section according to the line V-V in FIG. 1.

The cross-section of FIG. 5 shows how the side walls 5 and roof 6 are fastened.

The aforementioned folded edges 10 are fastened to the base 4, the roof 6 or other side walls 5 by means of bolt fasteners 15 or similar.

Furthermore it can be seen in this FIG. 5 that one of the side walls 5 is constructed of two metal plates 3 that are fastened together by means of mechanical fasteners 13, whereby the panel 3 that is on the inside of the housing 1 is folded so as to form one longitudinal profile 9 that acts as a support to fasten a component 17 of the compressor installation 2 thereon.

This FIG. 5 also shows that the longitudinal profile 9 of the base 4 acts as a support for mounting the drive 18 of the compressor installation 2, or a part of the drive 18, whereby in this case vibration dampers 19 are also mounted.

It is clear that the various longitudinal profiles 9 and/or transverse profiles 7 can be given a suitable shape that is specifically adapted to the compressor installation 2 concerned, so that the necessary supports are available for the drive 18, a part of the drive 18 and/or other components 17 of the machine.

Hereby preferably the same mechanical fasteners 13, with which a metal plate 3 is fastened to a longitudinal profile 9 and/or transverse profile 7, can also be used to fasten the aforementioned components 17 and/or drive 18 of the compressor or expander installation 1 on the longitudinal profile 9 and/or transverse profile 7.

This not only means that bolts 15 or blind rivet nuts 16 are used to fasten a component 17 to a longitudinal profile 9 or transverse profile 7, but also one single bolt 15 or blind rivet nut 16 is used to fasten both the metal plate 3 to the longitudinal profile 9 or transverse profile 7 concerned and to fasten the component 17 to this longitudinal profile 9 or transverse profile 7.

It is also important to note that the transverse profiles 9 of the base 4 of the housing 1 are designed such that they define openings that are accessible for a forklift truck, so that the housing 1 can easily be lifted and moved with a forklift truck.

It is clear that such a structure and assembly of the housing 1 is particularly modular, so that variants can easily be made for different types of compressor installations 2.

Figure 6:
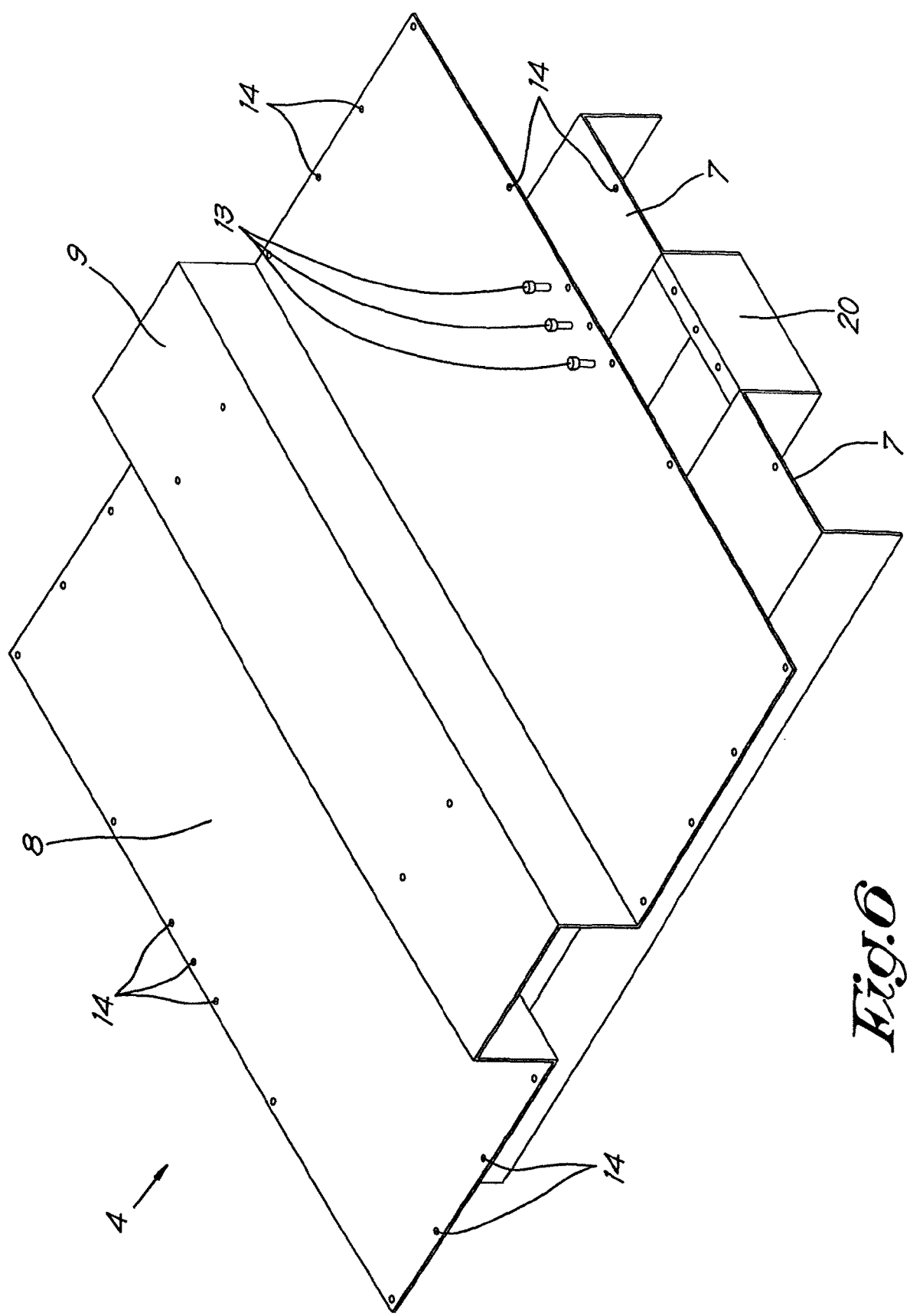
FIG. 6 schematically shows a variant of FIG. 4.

FIG. 6 shows a variant of the base 4 of the housing 1 of FIG. 4.

In this case the transverse profiles 7 are independent, separate transverse profiles 7, which in this case are placed parallel to one another at a distance from one another.

The transverse profiles 7 are galvanised beforehand or provided with an anti-corrosion surface coating.

In this case, but not necessarily, spacers 20 in the form of slats 20 are affixed between the transverse profiles 7 to ensure that the transverse profiles 7 are put in the suitable place during assembly of the housing 1.

As can be seen in FIG. 6, these slats 20 present a U-shape and they are fastened by means of mechanical fasteners 13 to the aforementioned baseplate 8.

In this way only the openings that are enclosed by the transverse profiles 7 themselves are accessible for a forklift truck, as the spaces between the transverse profiles 7 are blocked by these spacers 20. As a result the housing 1 cannot be lifted in an incorrect, unstable way.

It is clear that the side walls 5 can also be constructed in this way with separate, independent longitudinal profiles 9 and/or transverse profiles 7 instead of using folded metal plates 3.

The present invention is not limited to the embodiments described as an example and shown in the drawings, but a housing for a compressor or expander installation, vacuum pump, generator or similar according to the invention can be realised in all kinds of forms and dimensions without departing from the scope of the invention.

The invention claimed is:

1. An installation for a compressor or expander, vacuum pump, or generator, said installation comprising a housing comprising a plurality of metal plates which form at least side walls, a front wall, a back wall, a roof, and a base of the housing,
    wherein at least one of the plurality of metal plates is provided with one or more reinforcing profiles, said one or more reinforcing profiles comprising longitudinal profiles that extend in a certain longitudinal direction and/or transverse profiles that extend along a transverse direction that forms an angle to the longitudinal direction, wherein the plurality of metal plates and the longitudinal profiles and/or the transverse profiles are joined together solely by means of mechanical fasteners,
    wherein the base of the housing comprises at least two transverse profiles and a baseplate affixed by means of mechanical fasteners over an entirety of an upper surface of the at least two transverse profiles, wherein the baseplate is folded to include only one longitudinal profile extending away from the upper surfaces of the at least two transverse profiles, wherein the only one longitudinal profile comprises an open side that is open towards the at least two transverse profiles of the base and extends across an entire length of the baseplate,
    wherein the plurality of metal plates of the side walls are fastened by mechanical fasteners to at least one of the baseplate and the at least two transverse profiles of the base of the housing,
    wherein the at least two transverse profiles are in a U-shape, and
    wherein the compressor or expander, the vacuum pump, or the generator is attached to the only one longitudinal profile of the baseplate.

2. The installation according to claim 1, wherein the longitudinal profiles and/or the transverse profiles are formed by folding the at least one of the plurality of metal plates.

3. The installation according to claim 2, wherein the longitudinal profiles and/or the transverse profiles are formed by folding the at least one of the plurality of metal plates into a U-shape.

4. The installation according to claim 1, wherein the longitudinal profiles and/or transverse profiles act as a support for fastening components of the compressor or expander, vacuum pump or generator.

5. The installation according to claim 4, wherein the mechanical fasteners with which at least one of the plurality of metal plates is fastened to the longitudinal profiles and/or transverse profiles, are also used to fasten the components of the compressor or expander, vacuum pump or generator.

6. The installation according to claim 1, wherein the only one longitudinal profile of the baseplate and/or the at least two transverse profiles of the base are configured to be used to lift and move the compressor or expander installation, vacuum pump, or generator.

7. The installation according to claim 1, wherein the at least two transverse profiles of the base are placed parallel to one another at a distance from one another.

8. The installation according to claim 7, wherein spacers in the form of slats are placed between the at least two transverse profiles of the base.

9. The installation according to claim 8, wherein the slats are in a U-shape and are fastened by means of mechanical fasteners to the baseplate.

10. The installation according to claim 1, wherein the at least two transverse profiles of the base are formed by means of a metal plate that is folded to form the transverse profiles that are located parallel to one another.

11. The installation according to claim 1, wherein the only one longitudinal profile of the baseplate has a U-shaped cross-section.

12. The installation according to claim 11, wherein the only one longitudinal profile of the baseplate is configured for mounting of a drive or a part of the drive of the compressor or expander installation, vacuum pump or generator, with the aid of vibration dampers.

13. The installation according to claim 1, wherein at least one metal plate that forms a side wall of the housing is detachable and/or comprises access openings or doors.

14. The installation according to claim 1, wherein the mechanical fasteners comprise one or more or a combination of the following types of fasteners: a bolt fastener, rivets, or blind rivet nuts.

15. The installation according to claim 1, wherein the metal plates, the longitudinal profiles and the transverse profiles are galvanised beforehand and/or provided with an anti-corrosion surface coating.

16. The installation according to claim 1, wherein the plurality of metal plates and the longitudinal profiles and/or the transverse profiles are joined together without making use of welding.

17. A housing comprising a plurality of metal plates which form at least side walls, a front wall, a back wall, a roof, and a base of the housing,
    wherein at least one of the plurality of metal plates is provided with one or more reinforcing profiles, said one or more reinforcing profiles comprising longitudinal profiles that extend in a certain longitudinal direction and/or transverse profiles that extend along a transverse direction that forms an angle to the longitudinal direction, wherein the plurality of metal plates and the longitudinal profiles and/or the transverse profiles are joined together without making use of welding,
    wherein the base of the housing comprises at least two transverse profiles and a baseplate affixed by means of mechanical fasteners over an entirety of an upper surface of the at least two transverse profiles, wherein the baseplate is folded to include only one longitudinal profile extending away from the upper surfaces of the at least two transverse profiles, wherein the only one longitudinal profile comprises an open side that is open towards the at least two transverse profiles of the base and extends across an entire length of the baseplate,
    wherein the at least two transverse profiles are in a U-shape, and wherein the plurality of metal plates of the side walls are fastened by mechanical fasteners to at least one of the baseplate and the at least two transverse profiles of the base of the housing.

* * * * *